United States Patent
Ogushi (10) Patent No.: US 8,947,684 B2
(45) Date of Patent: Feb. 3, 2015

(54) PRINTING APPARATUS AND PROCESSING METHOD THEREFOR

(75) Inventor: Takuhiro Ogushi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 531 days.

(21) Appl. No.: 12/912,590

(22) Filed: Oct. 26, 2010

(65) Prior Publication Data

US 2011/0122436 A1    May 26, 2011

(30) Foreign Application Priority Data

Nov. 26, 2009  (JP) ................................ 2009-269265

(51) Int. Cl.
| | | |
|---|---|---|
| G06F 3/12 | (2006.01) | |
| G06F 1/32 | (2006.01) | |
| B41J 29/38 | (2006.01) | |
| G06F 15/16 | (2006.01) | |

(52) U.S. Cl.
CPC ............. G06F 3/1221 (2013.01); G06F 3/1247 (2013.01); G06F 3/1284 (2013.01); B41J 29/38 (2013.01); Y02B 60/1271 (2013.01)
USPC ......... 358/1.13; 358/1.15; 358/1.1; 358/1.18; 358/401; 713/330; 713/340

(58) Field of Classification Search
USPC .......... 358/1.1, 1.9, 1.11–1.18, 444; 713/300, 713/310, 320–324; 710/15–23; 345/501, 345/502
See application file for complete search history.

(56) References Cited

U.S. PATENT DOCUMENTS

| | | | | |
|---|---|---|---|---|
| 5,113,494 A | * | 5/1992 | Menendez et al. ............. | 345/502 |
| 6,708,234 B2 | | 3/2004 | Moteki et al. | |
| 6,954,278 B1 | * | 10/2005 | Cronch et al. ............... | 358/1.15 |
| 7,016,061 B1 | * | 3/2006 | Hewitt .......................... | 358/1.15 |
| 7,230,729 B1 | * | 6/2007 | Reardon et al. .............. | 358/1.13 |
| 2002/0040415 A1 | * | 4/2002 | Moteki et al. ................ | 710/260 |

(Continued)

FOREIGN PATENT DOCUMENTS

| | | | |
|---|---|---|---|
| JP | 7-121472 A | | 5/1995 |
| JP | 2000198240 A | * | 7/2000 |

(Continued)

OTHER PUBLICATIONS

Chinese Office Action dated Jan. 14, 2013 issued in corresponding Chinese Patent Application No. 201010557435.8.

(Continued)

*Primary Examiner* — Chad Dickerson
(74) *Attorney, Agent, or Firm* — Fitzpatrick, Cella, Harper & Scinto (57) ABSTRACT

A printing apparatus includes a first processor which is connected to a first memory and converts print data into an image data format based on a page description language, a second processor which is connected to a second memory and performs image processing for print data of the image data format to generate data of a format interpretable by a printing unit, and a communication control unit which externally receives print data and transfers the received print data to either the first memory or second memory based on a descriptor. The second processor determines the format of received print data. When the print data has the page description language format, the first memory is set as the transfer destination in the descriptor. When the print data has the image data format, the second memory is set as the transfer destination in the descriptor.

11 Claims, 8 Drawing Sheets

(56) References Cited

U.S. PATENT DOCUMENTS

| | | | |
|---|---|---|---|
| 2002/0178389 A1* | 11/2002 | Satoh | 713/310 |
| 2004/0004739 A1* | 1/2004 | Koike et al. | 358/1.16 |
| 2005/0157324 A1 | 7/2005 | Miyazaki | |
| 2006/0227372 A1* | 10/2006 | Takayanagi | 358/1.15 |
| 2008/0100862 A1* | 5/2008 | Isshiki | 358/1.15 |
| 2009/0235271 A1* | 9/2009 | Utsumi | 718/104 |
| 2009/0282278 A1* | 11/2009 | Satoh | 713/321 |

FOREIGN PATENT DOCUMENTS

| | | | |
|---|---|---|---|
| JP | 2001-257735 A | | 9/2001 |
| JP | 2002108584 A | | 4/2002 |
| JP | 2002108595 A | | 4/2002 |
| JP | 2005-210275 A | | 8/2005 |
| JP | 2006-240095 A | | 9/2006 |
| JP | 2006240095 A | * | 9/2006 |
| JP | 2008005300 A | | 1/2008 |

OTHER PUBLICATIONS

Japanese Office Action dated Jan. 17, 2014 issued in corresponding Japanese Patent Application No. 2009-269265.

* cited by examiner

PRINTING APPARATUS AND PROCESSING METHOD THEREFOR

BACKGROUND OF THE INVENTION

1. Field of the Invention

The present invention relates to a printing apparatus and processing method therefor.

2. Description of the Related Art

In general, a printing apparatus is connected to a host apparatus, and forms an image on an output sheet surface in accordance with print data from the host apparatus. In the host apparatus, application software such as a word processor or spreadsheet runs on basic software called an OS (Operating System). When printing from an application, the application transmits print data to the printing apparatus connected to the host apparatus via software called a device driver by using functions prepared in the OS. The device driver is made up of a set of functions that allow the application or OS to absorb the dependency of the function and capability of each peripheral device. A device driver for a printing apparatus is generally called a printer driver.

Printer drivers are classified into those that render print data in an image data (intermediate data) format for output, and those that generate PDL (Page Description Language) as a command directed to a printing apparatus capable of rendering processing. Some printing apparatus cope with only the image data format, and others cope with both the image data format and PDL format.

When a printing apparatus compatible with both the image data format and PDL format receives PDL data, it temporarily stores the data in the reception buffer in the memory. A command analyzer called DLG (Display List Generator) converts the PDL data stored in the reception buffer into intermediate language data called DL (Display List). The data converted into the DL has a list structure corresponding to a band area for each processing unit. The DL is rendered by hardware or software, generating image data of each band. The image data further undergoes color conversion, binarization processing, and the like, generating print data. To the contrary, when this printing apparatus receives data of the image data format, it temporarily stores the data in the reception buffer in the memory, and performs color conversion, binarization processing, and the like, generating print data.

As described above, a printing apparatus capable of rendering processing has complicated processing contents as compared to a printing apparatus capable of receiving only data of the image data format, and requires high-speed performance. To meet this requirement, there is proposed a technique of improving performance by arranging a plurality of processors and performing parallel processes in the printing apparatus capable of rendering processing.

As the technique regarding the performance improvement, techniques disclosed in Japanese Patent Laid-Open Nos. 2000-198240 (to be referred to as reference 1) and 2008-005300 (to be referred to as reference 2) are known. In the technique disclosed in reference 1, the processing speed is increased by parallel processes. More specifically, the first processor performs processes from reception of print data up to conversion of it into an intermediate code. The second processor executes processing of generating rendering data from the intermediate code, color conversion processing, and binarization processing.

Reference 2 discloses a printing apparatus having the first processor, the first memory connected to it, the second processor, the second memory connected to it, a communication interface, and a DMA controller. Before receiving processing data, the communication interface receives size data of processing data, and stores it in the first memory. The first processor controls the DMA controller in accordance with the size data stored in the first memory, and stores the processing data in the second memory.

As described above, a printing apparatus capable of rendering processing often improves performance by arranging and parallelly operating a plurality of processors. As performance improves, power consumption increases in the printing apparatus which includes a plurality of processors and parallelly operates them, compared to a printing apparatus which performs processing using a single processor.

In the technique of reference 1, the first processor performs processes from reception of print data up to generation of an intermediate code. The second processor executes processes up to generation of binary data from the intermediate code. Thus, the first and second processors always run, consuming large power.

In the technique of reference 2, size data is stored in the memory connected to the first processor, and processing data is stored in the memory connected to the second processor. Processing needs to be done using the two processors, and power consumption also becomes large, similar to reference 1.

SUMMARY OF THE INVENTION

The present invention provides a technique capable of reducing power consumption in an arrangement having a plurality of processors.

According to a first aspect of the present invention, there is provided a printing apparatus comprising: a printing unit configured to execute printing based on print data; a first processor connected to a first memory which stores the print data, and configured to convert the print data into an image data format based on a page description language which forms the print data; a second processor connected to a second memory which stores the print data, and configured to perform image processing for the print data of the image data format and generate data of a format interpretable by the printing unit; and a communication control unit configured to externally receive the print data and transfer the received print data to one of the first memory and the second memory based on a descriptor which defines a transfer destination of the print data, wherein the first processor includes a monitoring unit configured to monitor storage of the print data in the first memory; and a mode transition unit configured to, when the print data is not stored in the first memory for at least a predetermined time, shift a state of the first processor to a state in which power consumption is smaller than in a normal operation possible state, and the second processor includes a determination unit configured to determine a format of the externally received print data; and a setting unit configured to set the first memory as the transfer destination of the print data in the descriptor when the determination unit determines that the print data has a page description language format, and set the second memory as the transfer destination of the print data in the descriptor when the determination unit determines that the print data has the image data format.

According to a second aspect of the present invention, there is provided a processing method for a printing apparatus, the printing apparatus including: a printing unit configured to execute printing based on print data; a first processor connected to a first memory which stores the print data, and configured to convert the print data into an image data format based on a page description language which forms the print data; a second processor connected to a second memory which stores the print data, and configured to perform image processing for the print data of the image data format and generate data of a format interpretable by the printing unit; and a communication control unit configured to externally receive the print data and transfer the received print data to one of the first memory and the second memory based on a descriptor which defines a transfer destination of the print data, the method comprising: causing the first processor to monitor storage of the print data in the first memory, and when the print data is not stored in the first memory for at least a predetermined time, use a mode transition unit to shift a state of the first processor to a state in which power consumption is smaller than in a normal operation possible state; and causing the second processor to determine a format of the externally received print data, set the first memory as the transfer destination of the print data in the descriptor when the print data is determined to have a page description language format, and set the second memory as the transfer destination of the print data in the descriptor when the print data is determined to have the image data format.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that the following description will exemplify a printing apparatus which adopts an ink-jet printing system. However, the present invention is not limited to such specific system. For example, an electrophotography system using toners as color materials may be adopted.

The printing apparatus may be, for example, a single-function printer having only a printing function, or a multi-function printer having a plurality of functions including a printing function, FAX function, and scanner function. Also, the printing apparatus may be, for example, a manufacturing apparatus used to manufacture a color filter, electronic device, optical device, micro-structure, and the like using a predetermined printing system.

In this specification, "printing" means not only forming significant information such as characters or graphics but also forming, for example, an image, design, pattern, or structure on a printing medium in a broad sense regardless of whether the formed information is significant, or processing the medium as well. In addition, the formed information need not always be visualized so as to be visually recognized by humans.

Also, a "printing medium" means not only a paper sheet for use in a general printing apparatus but also a member which can fix ink, such as cloth, plastic film, metallic plate, glass, ceramics, resin, lumber, or leather in a broad sense.

Also, "ink" should be interpreted in a broad sense as in the definition of "printing" mentioned above, and means a liquid which can be used to form, for example, an image, design, or pattern, process a printing medium, or perform ink processing upon being supplied onto the printing medium. The ink processing includes, for example, solidification or insolubilization of a coloring material in ink supplied onto a printing medium.

Embodiment

Figure 1:
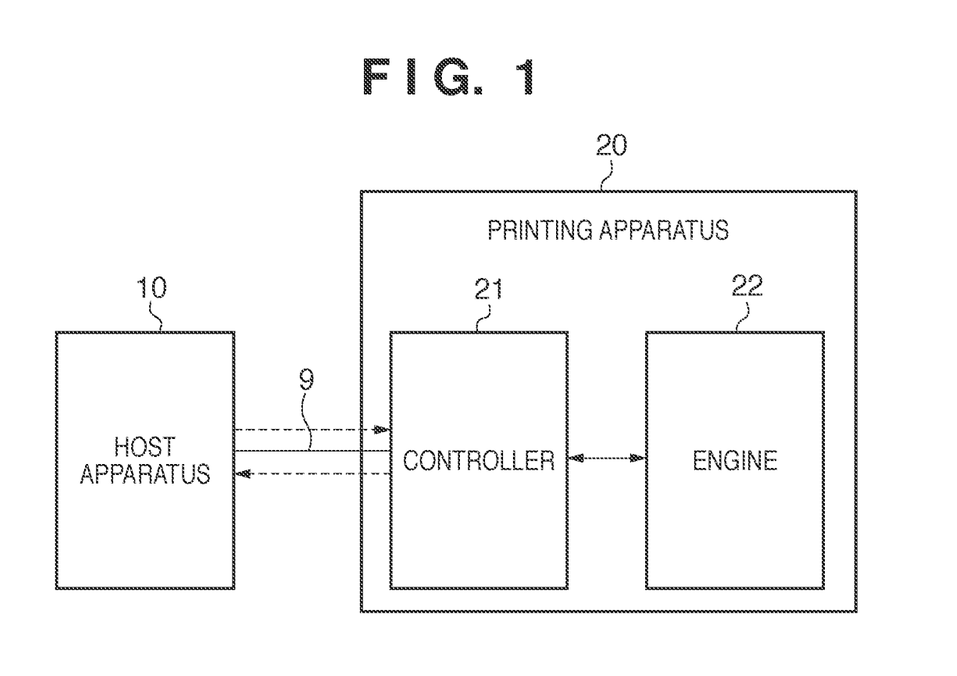
FIG. 1 is a block diagram exemplifying the overall configuration of a printing system including a printing apparatus 20 according to an embodiment of the present invention.

FIG. 1 is a block diagram exemplifying the overall configuration of a printing system including a printing apparatus 20 according to an embodiment of the present invention.

In the printing system, a host apparatus 10 and the printing apparatus 20 are connected via a communication unit (for example, LAN (Local Area Network), USB (Universal Serial Bus), or IEEE1394) 9.

The host apparatus 10 supplies print data to the printing apparatus 20. The host apparatus 10 is implemented by, for example, a personal computer, image reader, or digital camera.

The printing apparatus 20 forms and prints an image on a printing medium based on print data. The printing apparatus 20 includes a controller 21 which comprehensively controls various processes, and an engine 22 serving as a mechanism to print, which will be described in detail later. As described above, in the embodiment, the engine 22 adopts the ink-jet printing system.

The controller 21 performs, for example, the following processes:
  I/F (Interface) control of a communication unit (external bus) used to communicate with the host apparatus 10
  interpretation of a control command sent from the host apparatus 10, and generation of image data
  compression/decompression processing of print data
  various image processes when generating image data
  acceptance of an instruction from the user, and transmission of a command based on the instruction to the engine 22

Figure 2:
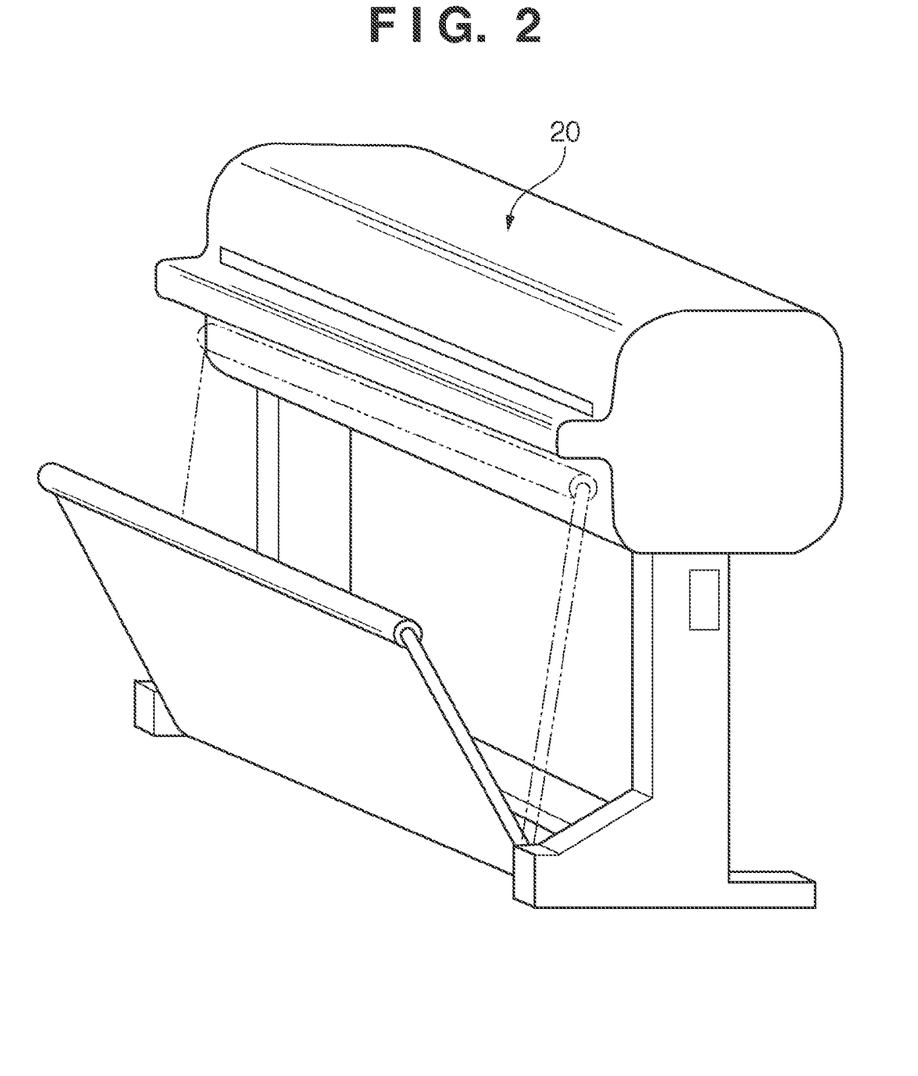
FIG. 2 is a perspective view exemplifying the outer appearance of the printing apparatus 20 shown in FIG. 1.

The engine 22 executes, for example, the following processes:
  reception of image data generated by the controller 21
  generation of discharge timing data of an ink-jet printhead (to be simply referred to as a printhead)
  print processing
  ink supply/recovery processing of the printhead
  conveyance of a printing medium, and motor control in the printhead operation The outer appearance of the printing apparatus 20 shown in FIG. 1 will be exemplified with reference to the perspective view of FIG. 2. Note that FIG. 2 shows an apparatus which prints on roll paper (continuous sheet), but the present invention is also applicable to an apparatus which prints on a cut sheet.

The printing apparatus 20 has a printhead (not shown), and controls it based on print data received from the host apparatus 10 or the like. More specifically, the printing apparatus 20 discharges ink to a printing medium from orifices arranged in the printhead, thereby forming an image (including a character and sign).

The printing apparatus 20 includes a recovery device (not shown) for maintaining and regaining the ink discharge performance of the printhead. In the printing apparatus 20, every time a predetermined time has elapsed or when clogging of an orifice or the like occurs, the printhead moves to a position where it faces the recovery device, and undergoes recovery processing. As the recovery processing, suction recovery processing, wiping (cleaning), preliminary discharge, or the like is executed.

Figure 3:
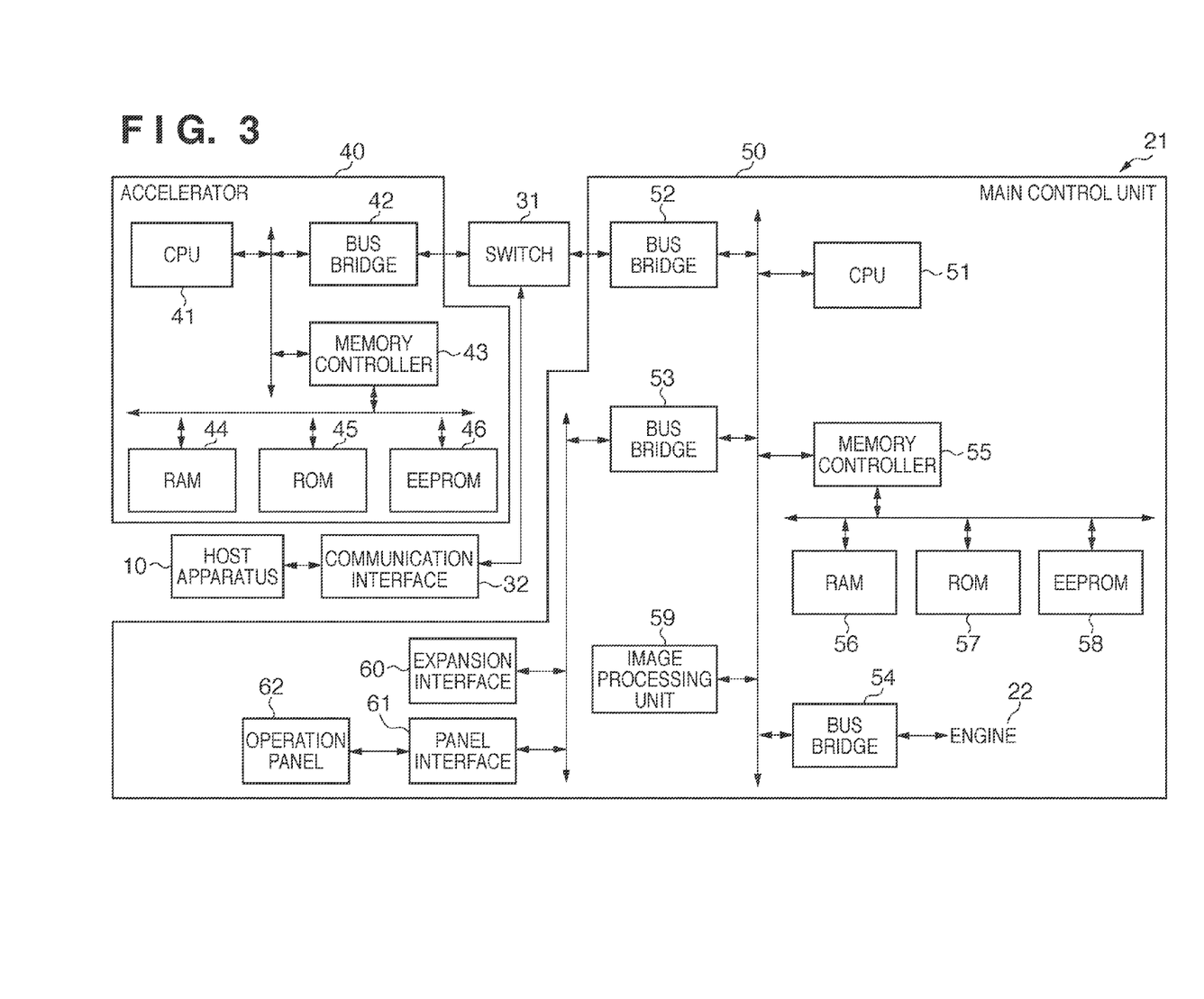
FIG. 3 is a block diagram exemplifying the functional arrangement of a controller 21 shown in FIG. 1.

FIG. 3 is a block diagram exemplifying the functional arrangement of the controller 21 shown in FIG. 1.

The controller 21 includes a switch 31, communication interface 32, accelerator 40, and main control unit 50.

The accelerator 40 generates, for example, intermediate data (image data) of each band based on print data. The accelerator 40 includes a CPU (Central Processing Unit) 41, bus bridge 42, memory controller 43, RAM (Random Access Memory) 44, ROM (Read Only Memory) 45, and EEPROM (Electrically Erasable PROM) 46.

The ROM 45 stores a control program and the like. The EEPROM 46 stores various constant data and the like. The RAM (to be also referred to as an accelerator RAM 44) 44 functions as the first memory, and stores a command signal, image information, and the like received from the host apparatus 10. The CPU 41 functions as the first processor, and controls execution of various processes using a control program and the like stored in the ROM 45. The CPU 41 (to be also referred to as an accelerator CPU 41) interprets a page description language (to be simply referred to as a PDL) based on various kinds of information stored in the memory, and generates image data.

The main control unit 50 performs color conversion, binarization processing, and the like for image data, generating print data. Note that the print data is in a data format that is interpretable by the engine 22. The main control unit 50 includes a CPU 51, bus bridges 52 to 54, a memory controller 55, a RAM 56, a ROM 57, an EEPROM 58, and an image processing unit 59. The main control unit 50 also includes an expansion interface 60, panel interface 61, and operation panel 62.

The ROM 57 stores a control program and the like. The EEPROM 58 stores various constant data and the like. The RAM (to be also referred to as a main control RAM 56) 56 functions as the second memory, and stores a command signal, image information, and the like received from the host apparatus 10. The CPU 51 functions as the second processor, and controls execution of various processes using a control program and the like stored in the ROM 57. The CPU 51 (to be also referred to as a main control CPU 51) controls print processing based on various kinds of information stored in the memory. The accelerator 40 has a power saving function of shifting to the power saving mode if no processing is done (for example, no print data is stored in the RAM 56) for a predetermined time or longer.

The main control unit 50 receives image data generated by the accelerator 40. Upon receiving the image data, the main control unit 50 converts it into binary data of each ink color, and outputs the binary data to the engine 22. The controller 21 and engine 22 transmit/receive various commands and status information to/from each other via the bus bridge 54.

The operation panel 62 inputs an instruction from the user as instruction information into the apparatus. This instruction information is transferred to the CPU 51 via the panel interface 61. The operation panel 62 turns on the LED and provides a display on the LCD in accordance with an instruction issued from the CPU 51 via the panel interface 61. The expansion interface 60 is arranged to expand the function, and allows connecting an expansion card such as a different type of communication interface.

The main control CPU 51 is connected to the accelerator CPU 41 via the switch 31; these CPUs can access each other. These CPUs are connected to the host apparatus 10 via the switch 31 and communication interface 32. The main control CPU 51 performs even power management control of the main control unit 50, accelerator 40, and communication interface 32. That is, the main control CPU 51 executes transition control of these units between a standby mode indicating a normal operation possible state, and a power saving mode in which power consumption is smaller than in the standby mode.

The switch 31 distributes data transfer destinations based on address information set by the main control CPU 51. The distribution destinations are, for example, the communication interface 32, bus bridge (on the main control unit side) 52, and bus bridge 42 (on the accelerator side). The communication interface 32 has a DMA (Direct Memory Access) transfer function. The communication interface 32 receives data from the outside (for example, the host apparatus 10), and transfers it to each building unit.

Figure 4:
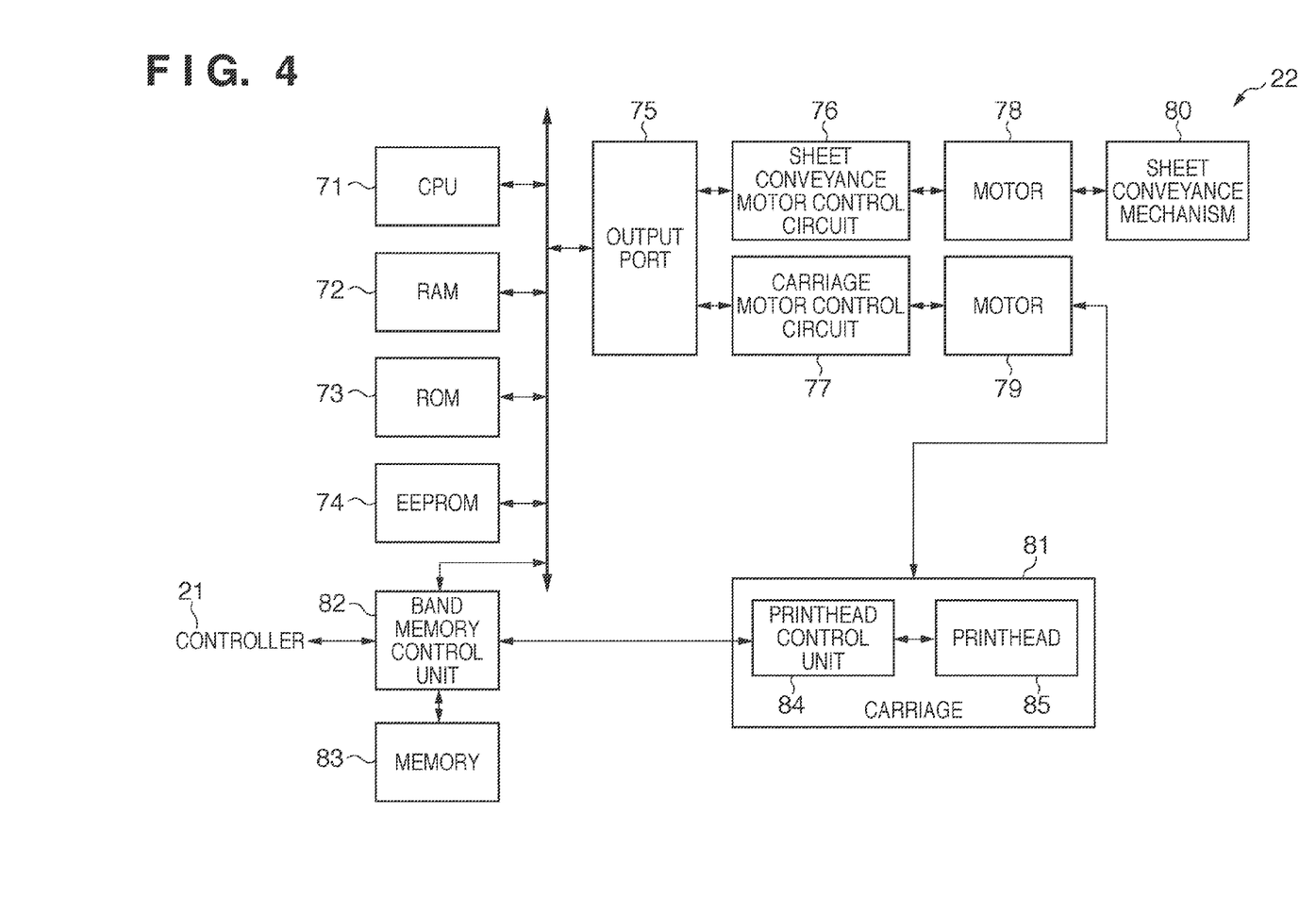
FIG. 4 is a block diagram exemplifying the functional arrangement of an engine 22 shown in FIG. 1.

FIG. 4 is a block diagram exemplifying the functional arrangement of the engine 22 shown in FIG. 1.

The engine 22 is a mechanism which functions as a printing unit and actually prints. The engine 22 includes a CPU 71, a RAM 72, a ROM 73, an EEPROM 74, an output port 75, a sheet conveyance motor control circuit 76, a carriage motor control circuit 77, motors 78 and 79, and a sheet conveyance mechanism 80. In addition, the engine 22 includes a carriage 81 having a printhead control unit 84 and printhead 85, a band memory control unit 82, and a memory 83.

The engine 22 is connected to the controller 21 via the band memory control unit 82. The ROM 73 stores a control program and the like. The EEPROM 74 stores various constant data and the like. The RAM 72 stores a command signal, image information, and the like received from the controller 21. The CPU 71 controls execution of various processes using a control program and the like stored in the ROM 73. The CPU 71 controls a print operation based on various kinds of information stored in the memory.

The CPU 71 operates the motor 79 via the output port 75 and carriage motor control circuit 77 to move the carriage 81. The CPU 71 operates the motor 78 via the output port 75 and sheet conveyance motor control circuit 76 to operate the sheet conveyance mechanism 80 such as a conveyance roller. Further, the CPU 71 controls the band memory control unit 82 and printhead control unit 84 based on various kinds of information stored in the RAM 72. Accordingly, the printhead 85 is driven to form an image on a printing medium.

Figure 5:
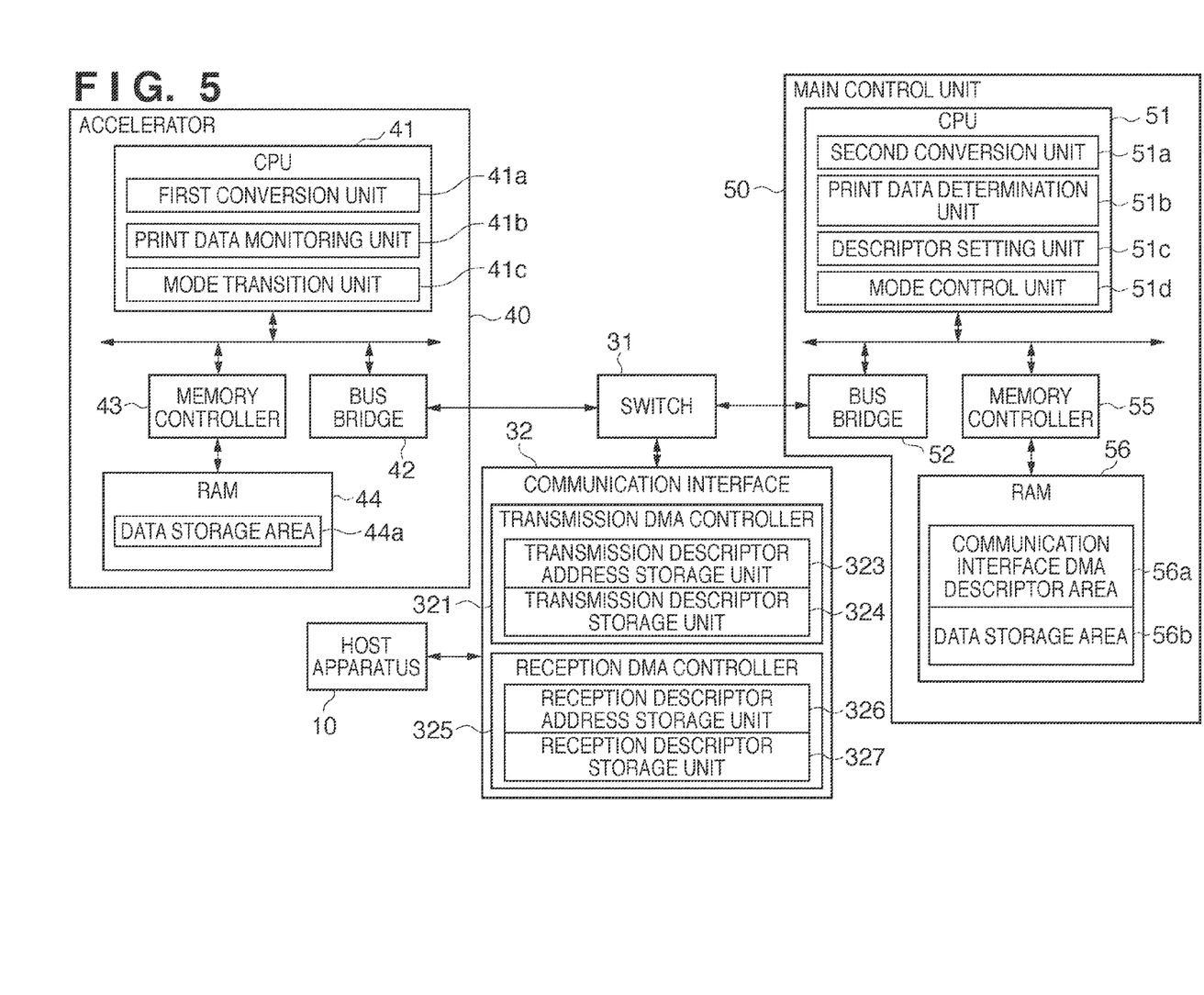
FIG. 5 is a block diagram exemplifying the connection between an accelerator 40, a main control unit 50, and a communication interface 32, and a functional arrangement implemented by the accelerator 40 and main control unit 50.

The connection between the accelerator 40, the main control unit 50, and the communication interface 32, and a functional arrangement implemented by the accelerator 40 and main control unit 50 will be exemplified with reference to FIG. 5. Note that part of the arrangement of the controller 21 shown in FIG. 3 is not illustrated in FIG. 5 for descriptive convenience.

The accelerator CPU 41 can access the RAM 44 via the memory controller 43. The main control CPU 51 can access the main control RAM 56 via the memory controller 55. The switch 31, communication interface 32, bus bridge (on the main control unit side) 52, and bus bridge 42 (on the accelerator side) are connected to each other by, for example, PCI (Peripheral Components Interconnect) Express. These units transfer data according to the PCI Express standard.

The accelerator CPU 41 can access the communication interface 32 via the bus bridge 42 and switch 31. The accelerator CPU 41 can access the main control RAM 56 via the bus bridge 42, switch 31, bus bridge 52, and memory controller 55. As functional units, the accelerator CPU 41 includes a first conversion unit 41a, print data monitoring unit 41b, and mode transition unit 41c. The first conversion unit 41a has a function of interpreting PDL data and generating image data. The print data monitoring unit 41b monitors storage of print data in the accelerator RAM 44. The mode transition unit 41c shifts the accelerator CPU 41 to the power saving mode or standby mode. Note that transition to the power saving mode is executed if no processing is done (for example, no print data is stored in the accelerator RAM 44) for a predetermined time or longer. Transition to the standby mode is executed based on an instruction from the main control CPU 51.

The main control CPU 51 can access the communication interface 32 via the bus bridge 52 and switch 31. The main control CPU 51 can access the RAM (on the accelerator side) 44 via the bus bridge 52, switch 31, bus bridge 42, and memory controller 43. The bus bridge 52 connected to the main control CPU 51 serves as the root complex. The main control CPU 51 sets the configuration of the switch 31, bus bridge 42, and communication interface 32 via the bus bridge 52.

As functional units, the main control CPU 51 includes a second conversion unit 51a, print data determination unit 51b, descriptor setting unit 51c, and mode control unit 51d. The second conversion unit 51a has a function of performing color conversion processing for image data generated by the accelerator 40, binarization processing of each ink color, and the like, and generating image data. The print data determination unit 51b analyzes print data (or printing language notification data) to determine which of the PDL format (Page Description Language format) and image data format is the print data format. The descriptor setting unit 51c sets a transmission descriptor and reception descriptor in a communication interface DMA descriptor area 56a. The mode control unit 51d executes the above-mentioned power management control. That is, the mode control unit 51d instructs the main control unit 50, accelerator 40, and communication interface 32 to shift to the standby mode or power saving mode.

The communication interface 32 can access the RAM (on the accelerator side) 44 and RAM (on the main control unit side) 56 via the switch 31, bus bridge 52, bus bridge 42, memory controller 55, and memory controller 43.

The communication interface 32 functions as a communication control unit. The communication interface 32 has a DMA transfer function, and includes a transmission DMA controller 321 and reception DMA controller 325. A transmission descriptor address storage unit 323 stores the storage destination address of a transmission descriptor. A transmission descriptor storage unit 324 stores a transmission descriptor acquired based on the storage destination address. A reception descriptor address storage unit 326 stores the storage destination address of a reception descriptor. A reception descriptor storage unit 327 stores a reception descriptor acquired based on the storage destination address. DMA transfer can be implemented by enabling the transmission DMA controller 321. DMA transfer can be implemented by enabling the transmission DMA controller 321 and reception DMA controller 325.

The transmission descriptor and reception descriptor are stored in the communication interface DMA descriptor area 56a in the RAM (on the main control unit side) 44. Therefore, the main control CPU 51 controls DMA transfer.

Figure 6:
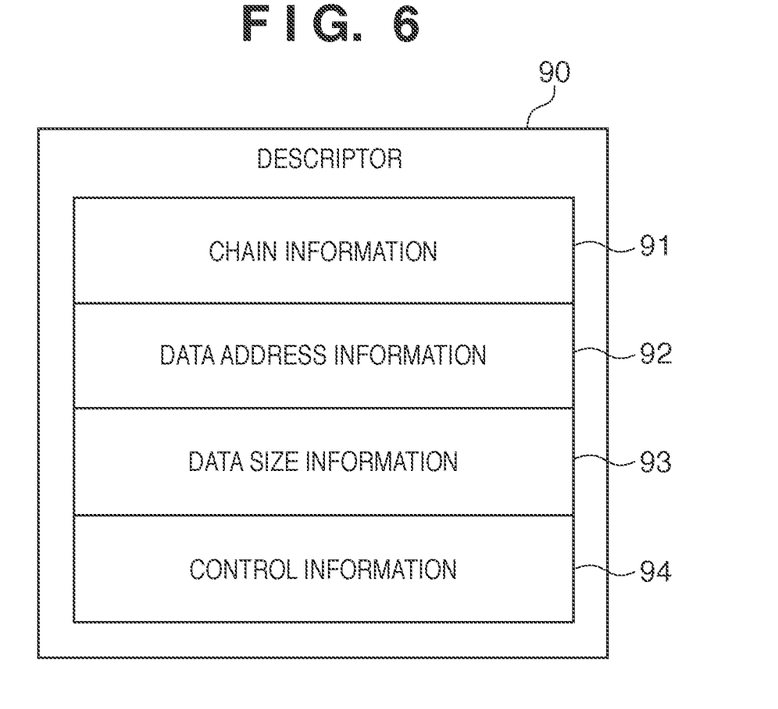
FIG. 6 is a view exemplifying the structure of a descriptor.

The structures of the transmission descriptor and reception descriptor (DMA transfer parameters) will be exemplified with reference to FIG. 6.

A descriptor 90 contains chain information 91, data address information 92, data size information 93, and control information 94.

The chain information 91 contains a flag indicating whether chain transfer has been executed, and an address where the descriptor 90 used in subsequent (next) DMA transfer is stored. If the chain transfer execution flag is valid after the end of DMA transfer, the descriptor 90 indicated by this address is read to continuously perform DMA transfer.

The data address information 92 contains the address of an area where transmission data or reception data is stored. The data size information 93 contains the data size of transmission data or reception data. After the end of transferring data defined by the data size, DMA transfer is completed. The control information 94 contains an interrupt control parameter and the like.

Figure 7:
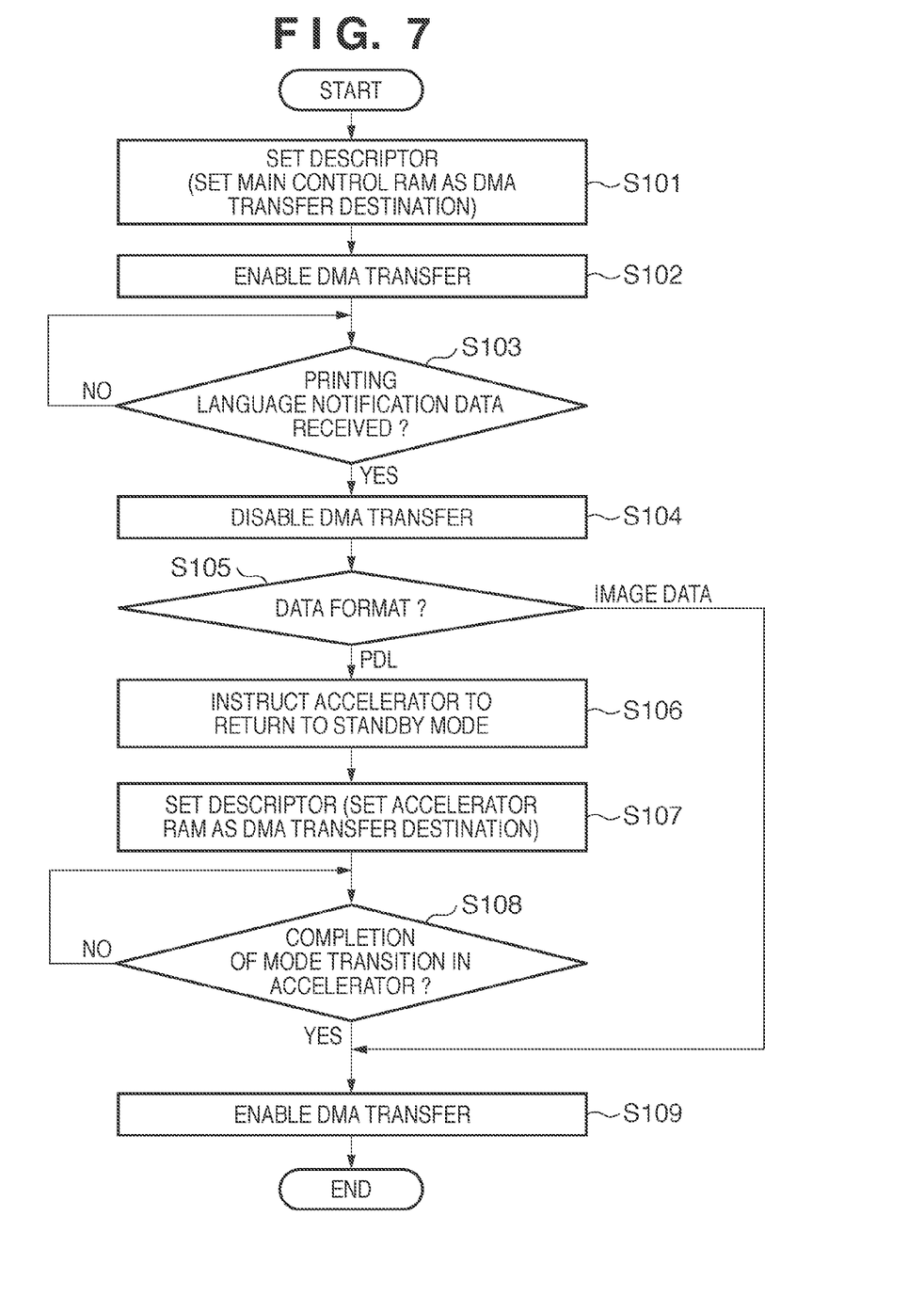
FIG. 7 is a flowchart exemplifying an operation in the printing apparatus 20 shown in FIG. 1.
Figure 8:
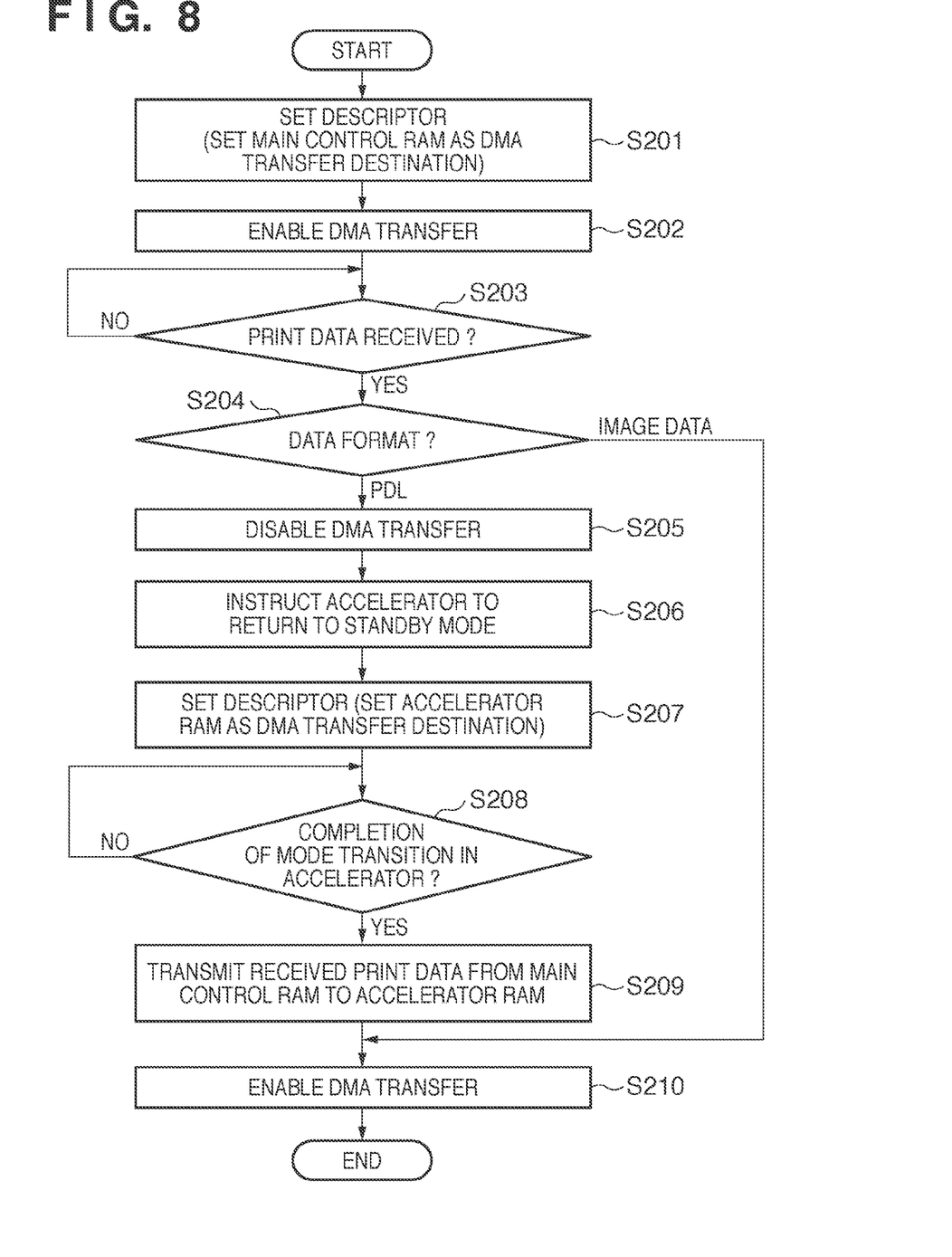
FIG. 8 is a flowchart exemplifying an operation in the printing apparatus 20 shown in FIG. 1.

FIGS. 7 and 8 are flowcharts exemplifying operations in the printing apparatus 20 shown in FIG. 1. The first operation in the printing apparatus 20 shown in FIG. 1 will be exemplified with reference to FIG. 7. As the first operation, an operation example when printing language notification data is sent before receiving print data will be explained.

The printing apparatus 20 waits for reception of print data. At this time, the accelerator 40 is in the power saving mode in order to reduce power consumption. Note that the accelerator 40 may be in the power-off state.

To prepare for transmission of printing language notification data, the main control CPU 51 uses the descriptor setting unit 51c to store the descriptor 90 in the communication interface DMA descriptor area 56a prior to reception of print data from the host apparatus 10 (S101).

The main control CPU 51 enables the transmission DMA controller 321, enabling DMA transfer (S102). At this time, a data storage area 56b of the main control RAM 56 is defined in the data address information 92 of the descriptor 90.

The printing apparatus 20 waits until it receives printing language notification data from the host apparatus 10 (NO in S103). If the printing apparatus 20 receives notification data during standby (YES in S103), the main control CPU 51 temporarily disables the DMA transfer of the communication interface 32 (S104). The main control CPU 51 uses the print data determination unit 51b to analyze the printing language notification data and determine, based on the analysis result, whether the format of print data sent from the host apparatus 10 is the PDL format or image data format.

If the main control CPU 51 determines that the PDL format is the print data format (PDL in S105), it uses the mode control unit 51d to instruct the accelerator 40 to return from the power saving mode to the standby mode (S106). As described above, the standby mode is a normal operation possible mode.

After the start of mode transition, the main control CPU 51 uses the descriptor setting unit 51c to set a data storage area 44a of the accelerator RAM 44 in the data address information 92 of the descriptor 90 in order to set the accelerator RAM 44 as the DMA transfer destination via the communication interface 32 (S107). This processing is executed while the accelerator 40 shifts from the power saving mode to the standby mode.

If the mode transition in the accelerator 40 is completed and the accelerator 40 is activated (YES in S108), the main control CPU 51 enables the transmission DMA controller 321, enabling DMA transfer (S109).

If the result of analysis in S105 indicates the image data format (image data in S105), the main control CPU 51 enables the transmission DMA controller 321, enabling DMA transfer (S109). In this case, the data storage area 56b of the main control RAM 56 is defined in the data address information 92 of the descriptor 90.

The second operation in the printing apparatus 20 shown in FIG. 1 will be exemplified with reference to FIG. 8. As the second operation, an operation example when no printing language notification data is sent before receiving print data will be explained.

The printing apparatus 20 waits for reception of print data. At this time, the accelerator 40 is in the power saving mode in order to reduce power consumption. Note that the accelerator 40 may be in the power-off mode.

The main control CPU 51 uses the descriptor setting unit 51c to store the descriptor 90 in the communication interface DMA descriptor area 56a prior to reception of print data from the host apparatus 10 (S201).

The main control CPU 51 enables the transmission DMA controller 321, enabling DMA transfer (S202). At this time, the data storage area 56b of the main control RAM 56 is defined in the data address information 92 of the descriptor 90.

The printing apparatus 20 waits until it receives print data from the host apparatus 10 (NO in S203). If the printing apparatus 20 receives print data (YES in S203), the main control CPU 51 uses the print data determination unit 51b to analyze part of the print data and determine, based on the analysis result, whether the format of the print data is the PDL format or image data format.

If the main control CPU 51 determines that the PDL format is the print data format (PDL in S204), it temporarily disables the DMA transfer of the communication interface 32 (S205). At this time, the received print data is temporarily stored in the data storage area 56b of the main control RAM 56. The main control CPU 51 uses the mode control unit 51d to instruct the accelerator 40 to return from the power saving mode to the standby mode (S206).

After the start of mode transition, the main control CPU 51 uses the descriptor setting unit 51c to set the data storage area 44a of the accelerator RAM 44 in the data address information 92 of the descriptor 90 in order to set the accelerator RAM 44 as the DMA transfer destination via the communication interface 32 (S207). This processing is executed while the accelerator 40 shifts from the power saving mode to the standby mode.

The mode transition in the accelerator 40 is completed and the accelerator 40 is activated (YES in S208). Then, the main control CPU 51 transmits the print data stored in the data storage area 56b of the main control RAM 56 to the data storage area 44a of the accelerator RAM 44 (S209). The main control CPU 51 enables the transmission DMA controller 321, enabling DMA transfer (S210).

If the result of analysis in S204 indicates the image data format (image data in S204), the DMA transfer continues, and print data is received. In this case, the accelerator 40 remains in the power saving mode (or power-off mode), and the print data is stored in the data storage area 56b of the main control RAM 56.

As described above, the embodiment can reduce power consumption in an arrangement having a plurality of processors. That is, power consumption can be reduced because the accelerator 40 does not shift from the power saving mode to the standby mode upon receiving image data.

A typical embodiment of the present invention has been exemplified. However, the present invention is not limited to the above-described and illustrated embodiment, and can be properly changed and modified without departing from the scope of the invention.

For example, the present invention can take embodiments of a system, apparatus, method, program, storage medium, and the like. More specifically, the present invention may be applied to a system including a plurality of devices, or an apparatus formed by a single device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-269265 filed on Nov. 26, 2009, which is hereby incorporated by reference herein in its entirety.

What is claimed is:

1. A printing apparatus comprising:
a first processor configured to generate print data of an image data format based on print data of a page description language; and
a second processor configured to generate data of a format interpretable by a printing unit based on print data of image data format;
a reception unit configured to receive print data and printing language notification data to be used for determining a format of the print data;
a determination unit configured to perform determination processing to determine whether the format of the print data received by said reception unit is a page description language format or the image data format based on the printing language notification data;
a transfer control unit configured to control transferring of the print data received by said reception unit such that, in a first case where said determination unit determines that the format of the print data received by said reception unit is the page description language format, the received print data is transferred to said first processor and then print data converted by said first processor based on the received print data is transferred to said second processor, and
in a second case where said determination unit determines that the format of the print data received by said reception unit is the image data format, the print data is transferred to said second processor without being transferred to said first processor; and
a transition unit configured to, in a case where the print data received by the reception unit is not transferred to said first processor for at least a predetermined time, shift a state of said first processor to a power saving state in which power consumption is smaller than that in a normal operation possible state,
wherein said transfer control unit controls transferring of the print data received by the reception unit such that, in a case where said determination unit determines that the format of the print data received by said reception unit is the image data format when or after said transition unit has shifted the state of said first processor to the power saving state, the received print data is transferred to said second processor while said first processor remains in the power saving state, and said transfer control unit invalidates transfer processing for the received print data after receiving the printing language notification data until the determination processing by said determination unit is ended, and validates the transfer processing for the received print data after the determination processing was ended in a second case, and after the determination processing had ended in the first case, the transfer control unit sets a descriptor indicating a first memory of the first processor as a transfer destination while the first processor is shifted from the power saving state to the normal operation possible state, and validates the transfer processing for the received print data.

2. The apparatus according to claim 1, wherein said determination unit determines the format based on printing language notification data sent prior to reception of the print data.

3. The apparatus according to claim 1, wherein said transition unit shifts the state of said first processor to one of a power saving mode and a power-off mode as the power saving state in a case where the print data is not transferred to said first processor for at least the predetermined time.

4. A processing method for an apparatus,
the apparatus comprising
a first processor configured to generate print data of an image data format based on print data of a page description language; and
a second processor configured to generate data of a format interpretable by a printing unit based on print data of image data format;
the method comprising:
receiving, by the apparatus, the print data and printing language notification data to be used for determining a format of the print data;
performing determination processing to determine whether the format of the print data received by the apparatus is a page description language format or the image data format based on the printing language notification data;
controlling transferring of the print data received by the apparatus such that, in a first case where it is determined that the format of the print data received by the apparatus is the page description language format, the received print data is transferred to said first processor and then print data converted by said first processor based on the received print data is transferred to said second processor, and in a second case where it is determined that the format of the print data received by the apparatus is the image data format, the received print data is transferred to said second processor without being transferred to said first processor; and
shifting, in a case where the print data received by the apparatus is not transferred to said first processor for at least a predetermined time, a state of said first processor to a power saving state in which power consumption is smaller than that in a normal operation possible state,
wherein, in the controlling transferring of the print data received by the apparatus, in a case where it is determined that the format of the print data received by the apparatus is the image data format when or after the state of said first processor has been shifted to the power saving state, the received print data is transferred to said second processor while said first processor remains in the power saving state, and in the controlling transferring of the print data received by the apparatus, transfer processing for the received print data is invalidated after receiving the printing language notification data until the determination processing is ended, and transfer processing for the received print data is validated after the determination processing was ended in a second case, and after the determination processing has ended in the first case, setting a descriptor indicating a first memory of the first processor as a transfer destination while the first processor is shifted from the power saving state to the normal operation possible state, and validate the transfer processing for the received print data.

5. The printing apparatus according to claim 1, further comprising:
a first memory for storing the print data to be transferred to said first processor;
a second memory for storing the print data to be transferred to said second processor; and
a DMA (Direct Memory Access) transfer unit configured to perform DMA transfer for transferring the print data received by said reception unit to said first memory or said second memory,
wherein said transfer control unit controls transferring the print data by setting a descriptor indicating a transferring destination to said DMA transfer unit.

6. The printing apparatus according to claim 5, wherein said DMA transfer unit sets the descriptor to said second memory before said reception unit receives the print data.

7. The method according to claim 4, further comprising determining the format based on printing language notification data sent prior to reception of the print data.

8. The method according to claim 4, further comprising determining the format based on part of the print data,
wherein in a case it is determined that the print data has the page description language format, said second processor transfers, to said first processor, the part of the print data.

9. The method according to claim 4, wherein the shifting the state of said first processor to one of a power saving mode and a power-off mode as the power saving state is performed in a case where the print data is not transferred to said first processor for at least the predetermined time.

10. The method according to claim 4, wherein
the apparatus further comprises:
a first memory for storing the print data to be transferred to said first processor;
a second memory for storing the print data to be transferred to said second processor; and
a DMA (Direct Memory Access) transfer unit configured to perform DMA transfer for transferring the print data received by the receiving to said first memory or said second memory,
wherein the controlling transferring the print data is performed by setting a descriptor indicating a transferring destination to said DMA transfer unit.

11. The method according to claim 10, further comprising setting the descriptor to said second memory prior to receiving the print data.

* * * * *